(12) United States Patent
Griffin et al.

(10) Patent No.: US 7,073,964 B2
(45) Date of Patent: Jul. 11, 2006

(54) STAGGERED KEYBOARD FOR A PORTABLE DEVICE

(75) Inventors: Jason T. Griffin, Waterloo (CA); Frank M. Tyneski, Kitchener (CA)

(73) Assignee: Research in Motion Limited, Waterloo (CA)

( * ) Notice: Subject to any disclaimer, the term of this patent is extended or adjusted under 35 U.S.C. 154(b) by 36 days.

(21) Appl. No.: 10/898,610

(22) Filed: Jul. 23, 2004

(65) Prior Publication Data

US 2005/0019079 A1    Jan. 27, 2005

(30) Foreign Application Priority Data

Jul. 25, 2003    (GB) .................................. 0317483.6

(51) Int. Cl.
*G09G 5/00* (2006.01)
*G06F 3/023* (2006.01)

(52) U.S. Cl. ....................... 400/486; 400/489; 400/493
(58) Field of Classification Search ................ 400/472, 400/481, 486, 488, 489, 492, 493
See application file for complete search history.

(56) References Cited

U.S. PATENT DOCUMENTS

| D313,413 S | 1/1991 | Langton |
| 5,367,298 A | 11/1994 | Axthelm |
| 5,625,354 A | 4/1997 | Lerman |
| 5,626,428 A * | 5/1997 | Miwa .......................... 400/486 |
| 6,876,354 B1 * | 4/2005 | Terasaki et al. ............. 345/168 |
| 2001/0006587 A1 | 7/2001 | Keinonen et al. |
| 2002/0003482 A1 * | 1/2002 | Bastle .......................... 341/22 |
| 2002/0041784 A1 * | 4/2002 | Thomas ....................... 400/472 |
| 2003/0063070 A1 * | 4/2003 | Kang .......................... 345/168 |
| 2004/0165924 A1 * | 8/2004 | Griffin ......................... 400/486 |
| 2004/0208681 A1 * | 10/2004 | Dechene ..................... 400/472 |

FOREIGN PATENT DOCUMENTS

| EP | 0 712 144 A2 | 5/1996 |
| WO | WO 01/56803 A1 | 8/2001 |
| WO | WO 01/88684 A1 | 11/2001 |

\* cited by examiner

*Primary Examiner*—Daniel J. Colilla
*Assistant Examiner*—Kevin D. Williams
(74) *Attorney, Agent, or Firm*—Jones Day; Krishna K. Pathiyal; Robert C. Liang

(57) ABSTRACT

A staggered keyboard for use with a portable device is provided. The staggered keyboard includes a plurality of keys arranged into a plurality of rows of keys. For each row of keys, the labeling of the keys is arranged in either a linear or an arced relationship depending upon the key layout, but the key centers are staggered from key to key along at least two distinct reference lines or arcs so that adjacent keys can be placed in overlapping and/or contiguous configurations thereby minimizing the size of the keyboard layout. By staggering the key centers while maintaining a familiar layout of the key labels, typing efficiency can be maintained while the overall size of the keyboard is reduced.

6 Claims, 6 Drawing Sheets

STAGGERED KEYBOARD FOR A PORTABLE DEVICE

CROSS REFERENCE TO PRIORITY APPLICATION

This application claims benefit of British Application No. 0317483.6, filed on Jul. 25, 2003 and entitled "Staggered Keyboard for a Portable Device." The entire specification of that application, including the drawing figures, is hereby incorporated into the present application by reference.

BACKGROUND

1. Field of Technology

The technology described in this patent application relates generally to the field of keyboards for portable devices. More specifically, a staggered keyboard for a portable device is provided that enables more efficient spacing of the keyboard in a format that is familiar to the user of the device.

2. Description of the Related Art

Portable devices having keyboards are known in this field. Several examples of such devices are shown in the following U.S. patents, all of which are assigned to the assignee of the present invention, and all of which are incorporated into the present application by reference: U.S. Pat. Nos. 6,278,442; 6,489,950; 6,452,588; D416,256; D433,460; D460,493; D464,995; and D461,803.

In these prior devices, the key centers are spaced along a common line or arc in each row of keys in the keyboard. The labeling on the keys are also placed along this same line or arc. Aligning the keys in this manner establishes a lower limit on the size of the keyboard because the keys in each row must be spaced some minimum distance apart from each other and cannot touch or overlap, otherwise the user would not be able to discern which key is being selected. Although the key size and spacing can be reduced in order to reduce the size of the keyboard, at some point the keys become too small or too close together to maintain efficient typing.

SUMMARY

A staggered keyboard for use with a portable device is provided. The staggered keyboard includes a plurality of keys arranged into a plurality of rows of keys. For each row of keys, the labeling of the keys is arranged in either a linear or an arced relationship depending upon the key layout, but the key centers are staggered from key to key along at least two distinct reference lines or arcs so that adjacent keys can be placed in overlapping and/or contiguous configurations thereby minimizing the size of the keyboard layout. By staggering the key centers while maintaining a familiar layout of the key labels, typing efficiency can be maintained while the overall size of the keyboard is reduced.

DETAILED DESCRIPTION

Figure 1:
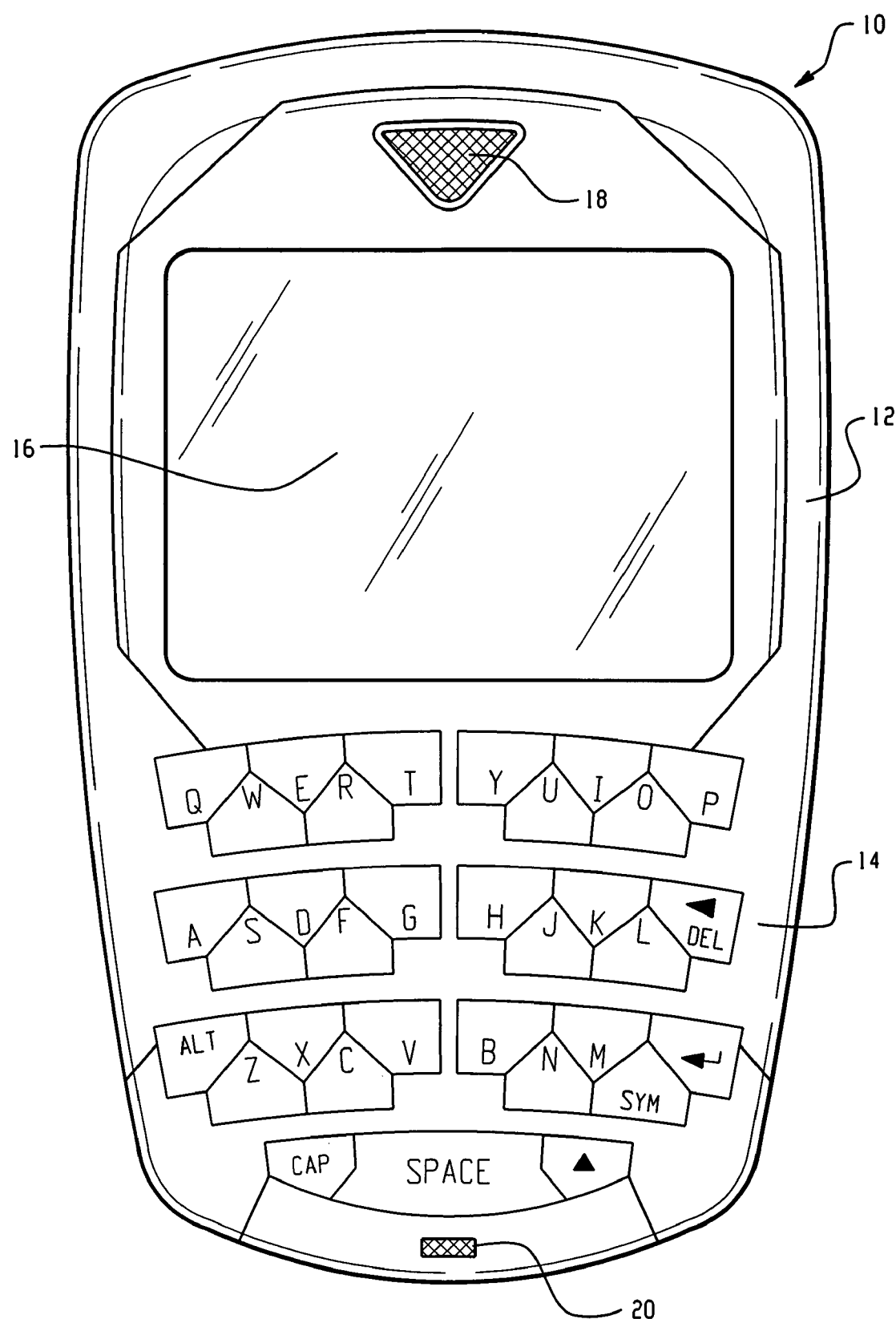
FIG. 1 is schematic representation of a portable device having a first example staggered keyboard.

Turning now to the drawing figures, FIG. 1 is a schematic representation of a portable device 10 having a first example staggered keyboard 14. This first example staggered keyboard 14 is described in more detail below with reference to FIG. 2. The example portable device 10, which is further described below with reference to FIG. 6, includes a housing 12, a display 16, a speaker 18, a microphone 20, and a staggered keyboard 14. In this example device 10, speaker 18, display 16, keyboard 14 and microphone 20 are all arranged in a top surface of the device housing 12. Other configurations of these elements are possible. The staggered keyboard 14 is preferably a QWERTY type keyboard, with the letters Q-W-E-R-T-Y-U-I-O-P arranged in a first, top row of the keyboard. The letters A-S-D-F-G-H-J-K-L and the Delete key are arranged in a second, middle row of the keyboard. And the Alt or Alternate key followed by the Z-X-C-V-B-N-M letter keys and the SYM or Symbol key and the Enter key arranged in a third, bottom row of the keyboard. Although the technology set forth herein is particularly well suited for use with QWERTY type keyboards, it is possible to use other keyboard configurations, such as the DVORAK keyboard, QWERTZ keyboard, AZERTY keyboard, or an alphabetically-ordered keyboard, etc.

The preferred portable device 10 is a handheld wireless computer capable of data communication, voice communication or both data and voice communication. Examples of such devices are shown in the above-mentioned US patents, all of which have been incorporated by reference. The technology described herein, in particular the use of a staggered keyboard, could be implemented in any type of portable device, however, such as a cellular phone, Personal Digital Assistant, two-way pager, etc.

Figure 2:
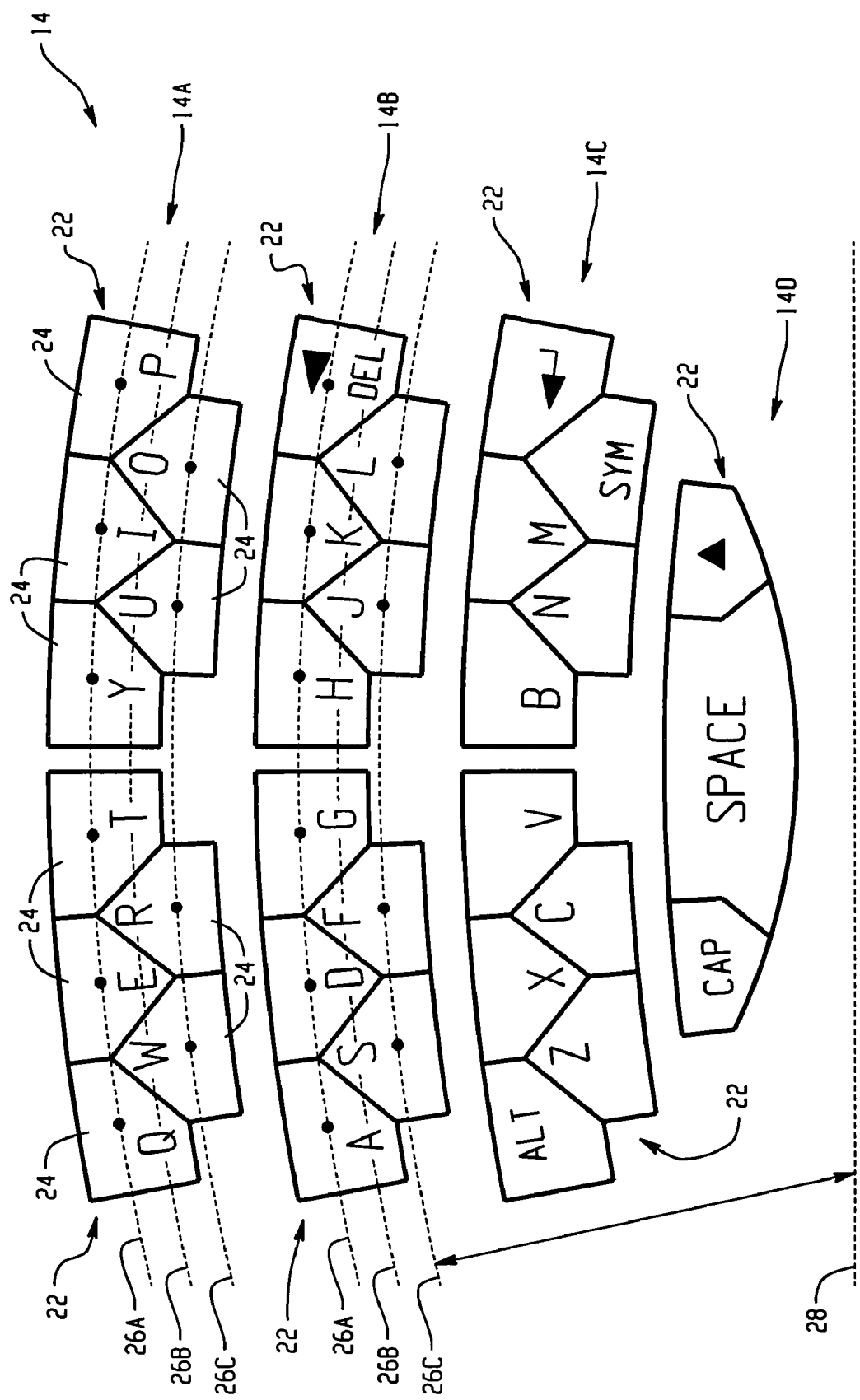
FIG. 2 is an expanded schematic of the staggered keyboard shown in FIG. 1.

FIG. 2 is an expanded schematic of the staggered keyboard 14 shown in FIG. 1. The staggered keyboard 14 includes three rows of keys 14A, 14B, and 14C, where 14A is the first, top row of keys, 14B is the second, middle row of keys, and 14C is the third, bottom row of keys. A fourth row 14D does not include any letter keys, but provides the space bar key, a CAP or capitalization key, and a shift key.

For each of the rows of keys 14A, 14B and 14C in this first example of a staggered keyboard, the keys 24 are arranged in a contiguous and overlapping manner. Considering the first, top row, for example, the keys are contiguous in the sense that the keys Q-W-E-R-T and Y-U-I-O-P are directly adjacent to one another with only negligible or no spacing between the keys. These two sub-sets of the keys in the first, top row, are each arranged or grouped into what is termed a super-key. A super-key is a plurality of keys that are arranged in a contiguous manner to one another so that there is negligible or no distance between the plurality of keys. FIG. 2 includes seven super-keys, two super-keys in each row of the QWERTY keyboard, and a seventh super-key comprising the CAP-SPACE-SHIFT keys below the QWERTY keys.

The keys are overlapping in the sense that if a vertical reference line were drawn through the keyboard, it could intersect more than one key in each row of keys. In a standard non-staggered keyboard, such a vertical reference line would only ever intersect one key in each of the row of keys. Consider, for example, a vertical reference line drawing through the W key at the highest point of the W key where it intersects with both the Q and E keys. A vertical reference line drawn through this point would intersect the W key and the E key, because of the arcing of the key rows.

If the vertical reference line were moved slightly to the left of this point, then the reference line would intersect the Q and W keys.

Three reference lines 26A, 26B and 26C are shown in FIG. 2 and are used herein to explain the concept of a staggered keyboard. In a staggered keyboard, the key centers in each row of keys are arranged along a top and bottom reference line 26A, 26B, with the key centers alternating between the top reference and the bottom reference. The primary key labeling (i.e., the alphabetical letter keys associated with the keys), however, is uniformly arranged along a single middle reference line 26B. (Note that other, secondary key labeling, such as alternative keys, punctuation, numerals, etc., need not necessarily be arranged along a single reference line but may also be staggered) It is this staggering of the key centers between the top and bottom reference lines while maintaining the primary key labeling along a single reference line that distinguishes the staggered keyboard from other miniature keyboard layouts, and which also enables the keyboard to be more efficiently laid out on the device housing. This more efficient layout enables the keys to be larger for a particular-sized portable device, or enables the portable device to be of a more narrow design. By staggering the key centers in this manner, the keys can be made to be contiguous and/or overlapping, while maintaining the feel of a standard keyboard layout because of the linear or arced relationship of all the key labels in a particular row of keys.

Consider the first, top row consisting of the letter keys Q-W-E-R-T-Y-U-I-O-P, for example. The letters Q-E-T-Y-I-P have their centers arranged along the top reference line 26A, while the letters W-R-U-O have their centers arranged along the bottom reference line 26C. The labels for all of the keys in this row, however, are arranged along the common middle reference line 26B. The arrangement of the second, middle row 14B and the third, bottom row 14C is similar to the row 14A. In FIG. 2, the three rows of keys are each arced with respect to a horizontal reference line 28. In this configuration, the reference lines 26A, 26B, and 26C are also arranged in an arc. As shown below, in other configurations the references lines 26A, 26B and 26C are not arced, but instead are arranged in a linear manner.

Figure 3:
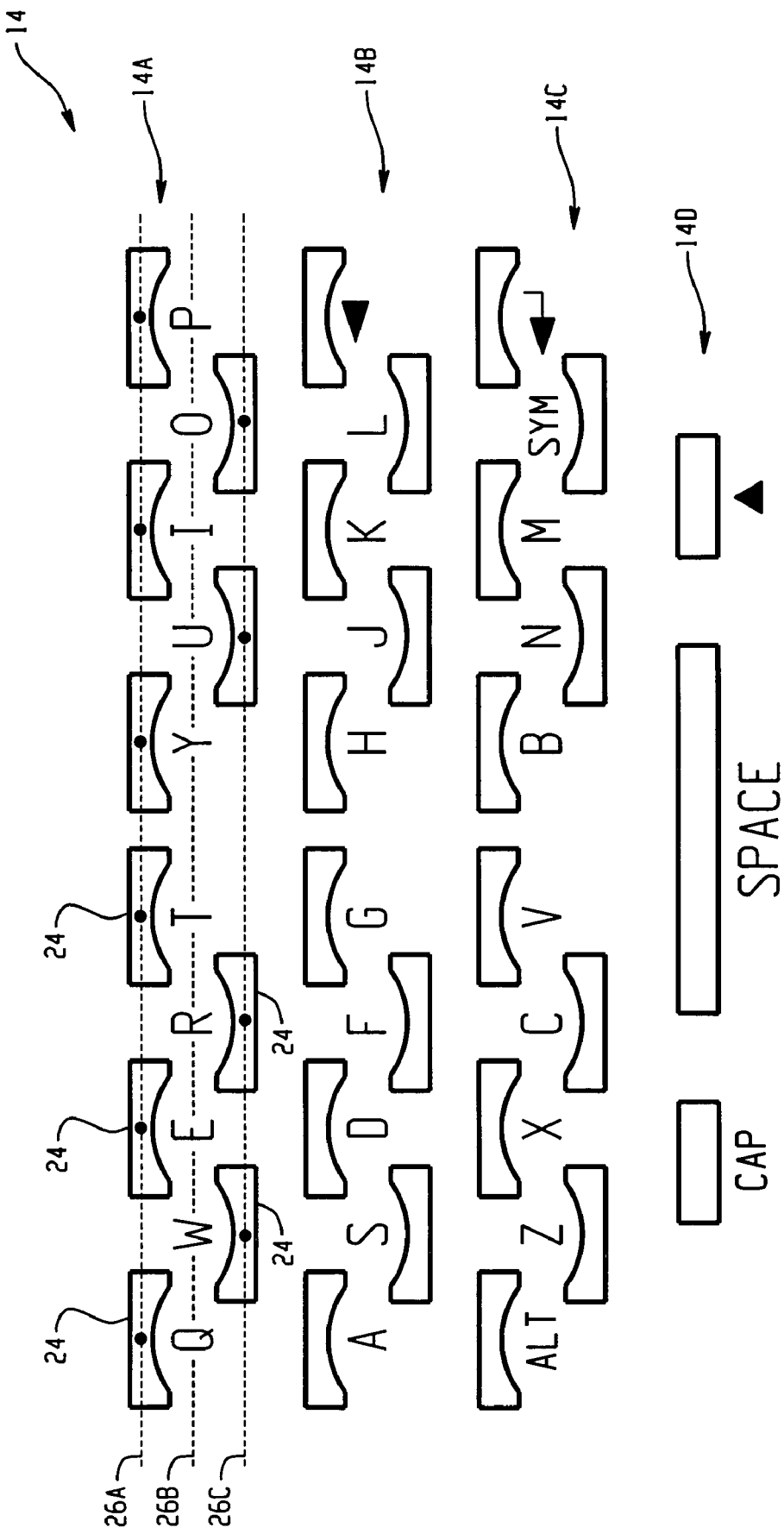
FIG. 3 is a second example staggered keyboard.
Figure 4:
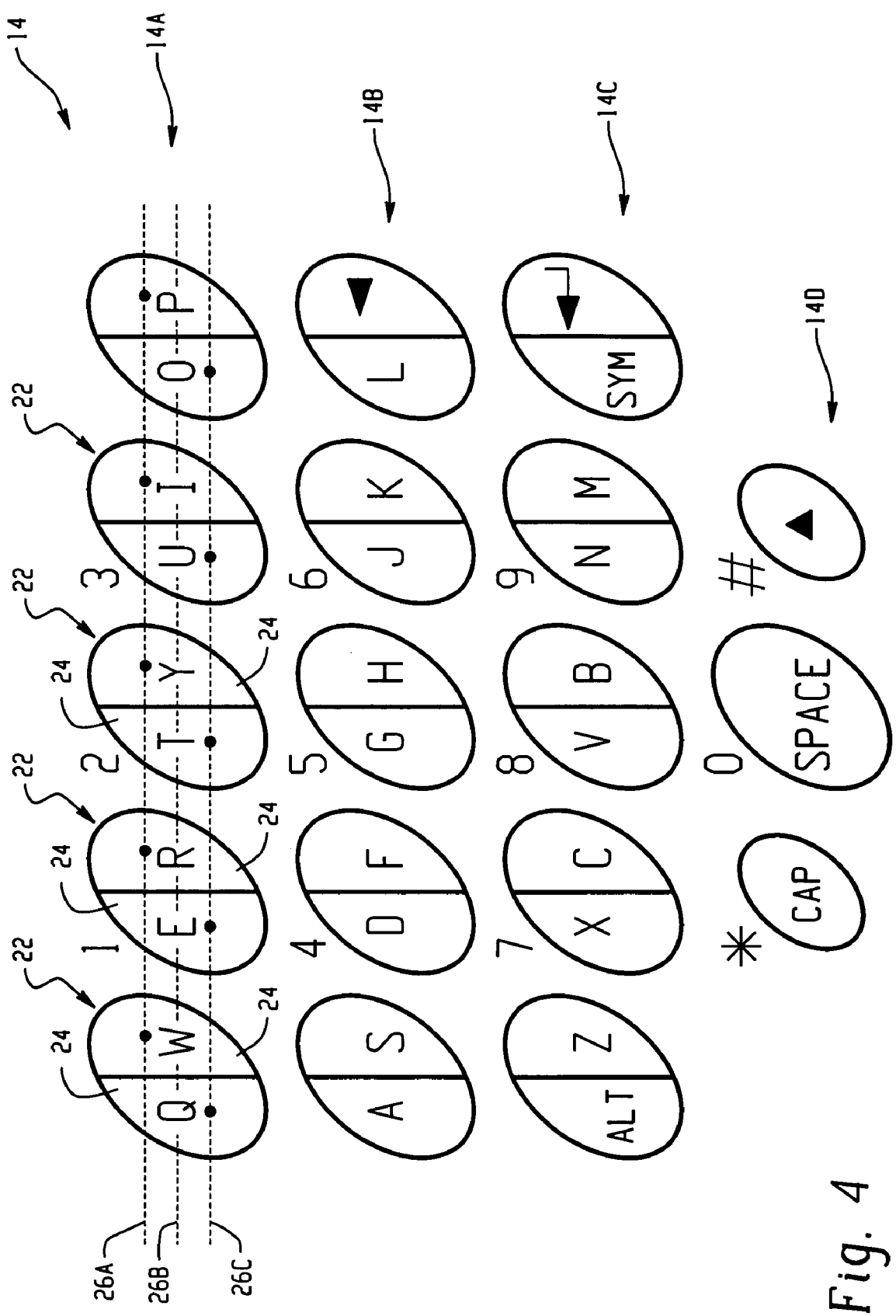
FIG. 4 is a third example staggered keyboard.
Figure 5:
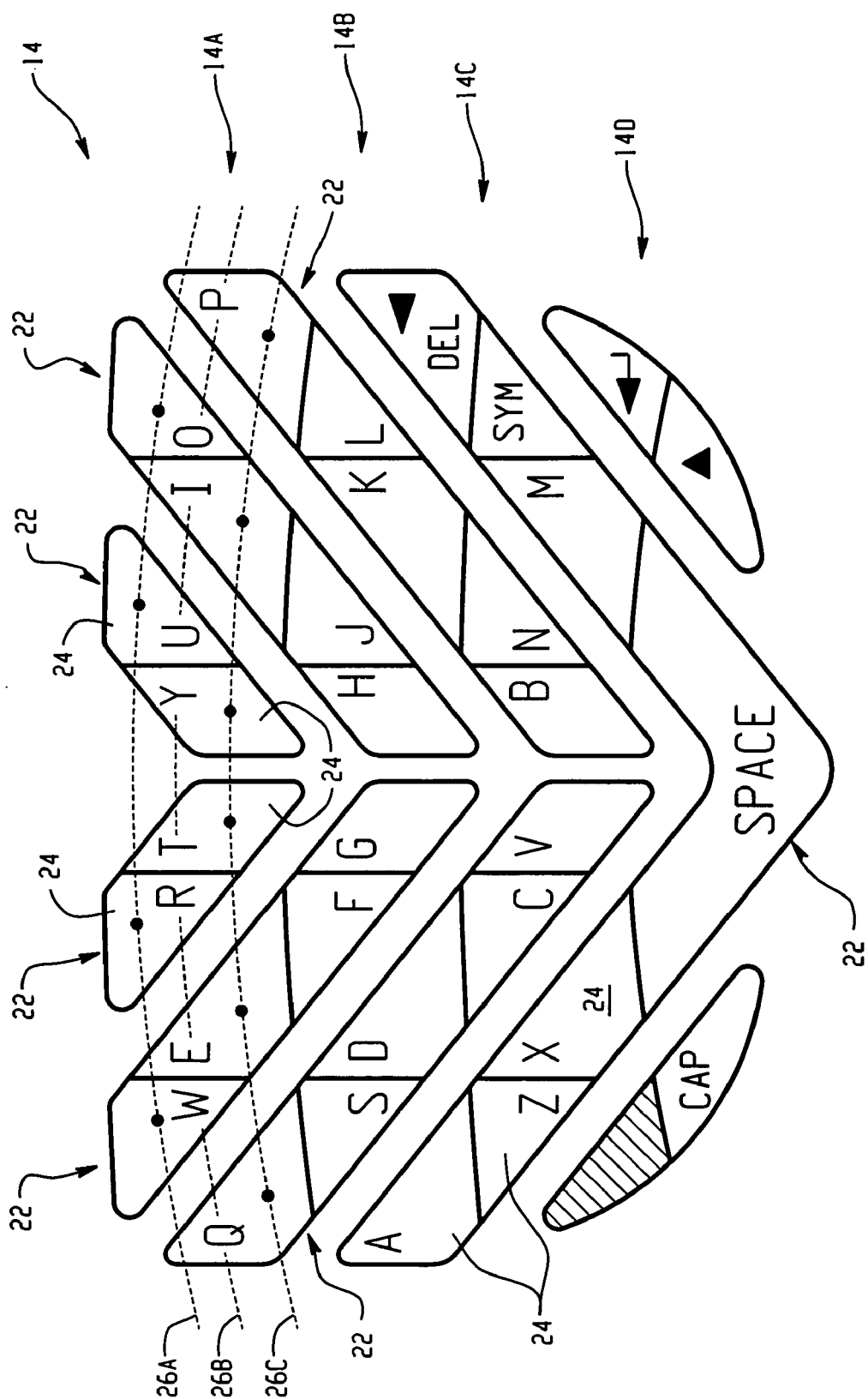
FIG. 5 is a fourth example staggered keyboard.

In the designs shown in FIGS. 2, 3 and 5 (see below for description of FIGS. 3 and 5), the staggering of the keys in a given row is mirrored about a central vertical reference line bisecting the portable device. In these configurations, the key centers alternate between the two reference lines from key to key, except for the centrally located keys, which are arranged on the same horizontal reference line. In FIG. 4, however, the staggering of the key centers from key to key is continuous across the entire row of the keyboard.

FIG. 3 is a second example staggered keyboard 14. In this embodiment, the keys 24 are rectangular-shaped with a curved cut-out to accommodate the placement of the key labels. The key labels are placed directly onto the device housing 12 in this embodiment and are not printed on the keys 24. In addition to this difference, in this second embodiment the three rows of letter keys 14A, 14B and 14C and the associated labels are arranged along three linear reference lines 26A, 26B, 26C as distinguished from the arced reference lines shown in FIG. 1. The keys 24 in this embodiment are overlapping, but are not contiguous. For example, a vertical reference line can be drawn that intersects both the Q and W keys. Note also that the W key overlaps with the E key. In this manner, each key 24 in a particular row of keys 14A, 14B or 14C can be positioned so as to overlap with one other key (for example the Q key only overlaps the W key) or two other keys (for example the W key overlaps both the Q and E keys), depending on the placement of the keys.

FIG. 4 is a third example staggered keyboard 14. In this embodiment, the keys 24 are contiguous, but not overlapping. Each key 24 in this embodiment is an oval-shaped super-key 22 that comprises two sub-keys 24, each sub-key comprising one-half of the oval shaped super-key. By vertically-bisecting the oval-shaped super-key 22, each of the sub-key centers is staggered along one of two distinct reference lines 26A, 26C, while the key labeling is maintained across a common central reference line 26B.

FIG. 5 is a fourth example staggered keyboard 14. In this embodiment, the keys 24 are contiguous and overlapping. Although the keys 24 in this embodiment are formed into seven super-keys, similar to FIG. 2, the super-keys 22 may extend from one row of keys to another, while in FIG. 2 the super-keys only included keys in a single row of keys. In FIG. 5 the seven super-keys include the following combination of keys: R-T; Y-U; W-E-F-G; H-J-I-O; Q-S-D-C-V; B-N-K-L-P; and A-Z-X-SPACE-M-SYM-DEL. For some of these super-keys, such as the first two listed, the sub-keys are both in the same row of keys, namely the first row. But for other super-keys, such as the Q-S-D-C-V and B-N-K-L-P keys, the sub-keys are in different rows, in this case all three of the letter key rows of the QWERTY keyboard. As in FIG. 2, the key centers and key labeling in this embodiment are arranged along a set of reference arcs 26A, 26B and 26C.

Figure 6:
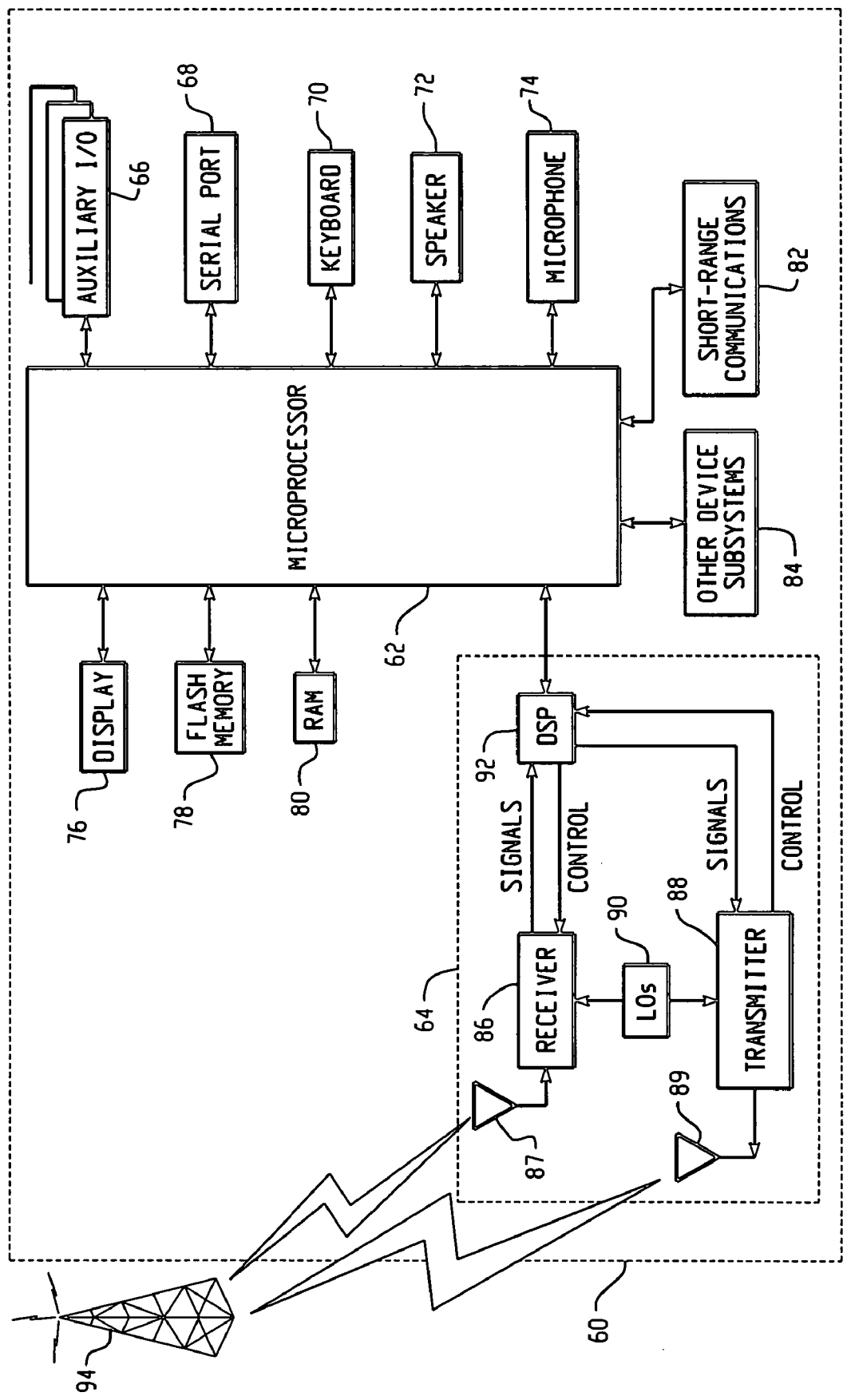
FIG. 6 is a block diagram of an example portable device in which a staggered keyboard may be implemented.

FIG. 6 is a block diagram of an example portable device 60 in which a staggered keyboard may be implemented. The portable device 60 includes a processing device 62, a communications subsystem 64, a short-range communications subsystem 82, input/output devices 66–76, memory devices 78, 80, and various other device subsystems 84. The portable device 60 is preferably a two-way communication device having voice and data communication capabilities. In addition, the device 60 preferably has the capability to communicate with other computer systems via the Internet.

The processing device 62 controls the overall operation of the portable device 60. System software executed by the processing device 62 is preferably stored in a persistent store such as a flash memory 78, but may also be stored in other types of memory devices, such as a read only memory (ROM) or similar storage element. In addition, system software, specific device applications, or parts thereof, may be temporarily loaded into a volatile store, such as a random access memory (RAM) 80. Communication signals received by the portable device may also be stored to RAM 80.

The processing device 62, in addition to its operating system functions, enables execution of software applications on the device 60. A predetermined set of applications that control basic device operations, such as data and voice communications, may be installed on the device 60 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 94. Preferably, the PIM data items are seamlessly integrated, synchronized and updated via the wireless network 94 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219, 694, which is owned by the assignee of the present application, and which is hereby incorporated into the present application by reference.

Communication functions, including data and voice communications, are performed through the communication subsystem 64, and possibly through the short-range communications subsystem 82. If the portable device 60 is enabled for two-way communications, then the communication subsystem 64 includes a receiver 86, a transmitter 88, and a processing module, such as a digital signal processor (DSP) 92. In addition, the communication subsystem 64, configured as a two-way communications device, includes one or more, preferably embedded or internal, antenna elements 87, 89, and local oscillators (LOs) 90. The specific design and implementation of the communication subsystem 64 is dependent upon the communication network in which the mobile device is intended to operate. For example, a device destined for a North American market may include a communication subsystem 64 designed to operate within the Mobitex™ mobile communication system or DataTAC™ mobile communication system, whereas a device intended for use in Europe may incorporate a General Packet Radio Service (GPRS) communication subsystem.

Network access requirements vary depending upon the type of communication system. For example, in the Mobitex™ and DataTAC™ networks, portable devices 60 are registered on the network using a unique personal identification number or PIN associated with each device. In GPRS networks, however, network access is associated with a subscriber or user of a device 60. A GPRS device therefore requires a subscriber identity module, commonly referred to as a SIM card, in order to operate on a GPRS network.

When required network registration or activation procedures have been completed, the portable device 60 may send and receive communication signals over the communication network. Signals received by the antenna 87 through the communication network 94 are input to the receiver 86, which may perform such common receiver functions as signal amplification, frequency down conversion, filtering, channel selection, and analog-to-digital conversion. Analog-to-digital conversion of the received signal allows the DSP 92 to perform more complex communication functions, such as demodulation and decoding. In a similar manner, signals to be transmitted are processed by the DSP 92, and are the input to the transmitter 88 for digital-to-analog conversion, frequency up-conversion, filtering, amplification and transmission over the communication network 94 via the antenna 89.

In addition to processing communication signals, the DSP 92 provides for receiver 86 and transmitter 88 control. For example, gains applied to communication signals in the receiver 86 and transmitter 88 may be adaptively controlled through automatic gain control algorithms implemented in the DSP 92.

In a data communication mode, a received signal, such as a text message or web page download, is processed by the communication subsystem 64 and input to the processing device 62. The received signal is then further processed by the processing device 62 for output to a display 76, or alternatively to some other auxiliary I/O device 66. A device user may also compose data items, such as e-mail messages, using a keyboard 70, such as a staggered QWERTY-style keyboard as described herein, and/or some other auxiliary I/O device 66, such as a touchpad, a rocker switch, a thumb-wheel, or some other type of input device. The composed data items may then be transmitted over the communication network 94 via the communication subsystem 64.

In a voice communication mode, overall operation of the device 60 is substantially similar to data communication mode, except that received signals are output to a speaker 72, and signals for transmission are generated by a microphone 74. Alternative voice or audio I/O subsystems 84, such as a voice message recording subsystem, may also be implemented on the device. In addition, the display 76 may also be utilized in voice communication mode, for example to display the identity of a calling party, the duration of a voice call, or other voice call related information.

The short-range communications subsystem 82 enables communication between the portable device 60 and other proximate systems or devices, which need not necessarily be similar devices. For example, the short-range communications subsystem 82 may include an infrared device and associated circuits and components, or a Bluetooth™ communication module to provide for communication with similarly-enabled systems and devices.

This detailed description uses one or more examples to disclose the invention, including the best mode known to the inventors at the time of the application, and also to enable a person skilled in the art to make and use the invention.

We claim:

1. A keyboard, comprising:
a plurality of keys arranged into a plurality of rows of keys, wherein each of the keys is associated with a letter of the alphabet, and wherein each of the plurality of rows of keys includes a plurality of keys and a plurality of labels representing the letter of the alphabet associated with each of the plurality of keys, wherein the plurality of keys are arranged in a QWERTY configuration;
wherein within each of the rows of keys, the plurality of keys are arranged in a staggered pattern such that the key centers for the plurality of keys in the row are arranged along first and second reference lines, with a first portion of the key centers arranged along the first reference line and a second portion of the key centers arranged along the second reference line so that the keys in each of the rows of keys are staggered along the first and second reference lines in an alternating pattern, and wherein at least a portion of the plurality of keys are formed into super-keys, each super-key comprising at least two contiguously-spaced sub-keys; and
wherein within each of the rows of keys, the plurality of labels representing the letters of the alphabet associated with each of the plurality of keys are all arranged along a third, common reference line, wherein the first, second and third reference line are arced.

2. The keyboard of claim 1, wherein the keyboard is an alphabetically arranged keyboard.

3. The keyboard of claim 1, wherein at least a portion of the plurality of keys are positioned in an overlapping manner defined such that a vertical reference line through the keyboard intersects more than one key in each of the rows of keys.

4. The keyboard of claim 1, wherein the keyboard comprises seven super-keys.

5. The keyboard of claim 1, wherein the super-keys comprise five sub-keys arranged in an overlapping configuration.

6. The keyboard of claim 1, wherein the plurality of keys are arranged into three rows of keys, and wherein a fourth row of keys includes at least a space bar key.

* * * * *